(12) United States Patent
Sturman

(10) Patent No.: US 9,026,339 B1
(45) Date of Patent: May 5, 2015

(54) MULTIPLE FUEL-TYPE COMPRESSION IGNITION ENGINES AND METHODS

(75) Inventor: Oded Eddie Sturman, Woodland Park, CO (US)

(73) Assignee: Sturman Digital Systems, LLC, Woodland Park, CO (US)

( * ) Notice: Subject to any disclaimer, the term of this patent is extended or adjusted under 35 U.S.C. 154(b) by 576 days.

(21) Appl. No.: 13/435,414

(22) Filed: Mar. 30, 2012

Related U.S. Application Data

(60) Provisional application No. 61/469,553, filed on Mar. 30, 2011.

(51) Int. Cl.
*F02B 11/02* (2006.01)
*F02B 23/10* (2006.01)

(52) U.S. Cl.
CPC .................................... *F02B 23/10* (2013.01)

(58) Field of Classification Search
CPC .............. F02B 21/00; F02B 3/00; F02B 3/06; F02B 11/02; F02B 69/04; F02D 19/00; F02D 19/0642; Y02T 10/36
USPC ............. 123/27 GE, 525, 526, 527, 673, 585; 701/103
See application file for complete search history.

(56) References Cited

U.S. PATENT DOCUMENTS

| | | | | |
|---|---|---|---|---|
| 4,275,698 A * | 6/1981 | Dennetiere | .................... | 123/527 |
| 5,228,423 A * | 7/1993 | Oikawa et al. | ................ | 123/525 |
| 6,427,660 B1 | 8/2002 | Yang | | |
| 7,793,638 B2 * | 9/2010 | Sturman | ....................... | 123/434 |
| 7,954,472 B1 | 6/2011 | Sturman | | |
| 7,958,864 B2 * | 6/2011 | Sturman | ....................... | 123/321 |
| 8,327,831 B2 * | 12/2012 | Sturman | ....................... | 123/525 |
| 8,412,441 B1 * | 4/2013 | Sturman | ....................... | 701/105 |
| 8,443,769 B1 * | 5/2013 | Lippitt | ........................ | 123/70 R |
| 8,887,690 B1 * | 11/2014 | Sturman | ....................... | 123/294 |
| 2008/0264393 A1 | 10/2008 | Sturman | | |
| 2010/0229838 A1 | 9/2010 | Sturman | | |
| 2011/0083643 A1 | 4/2011 | Sturman | | |

OTHER PUBLICATIONS

White, T.R., et al., "Direct Injection of Natural Gas/Liquid Diesel Fuel Sprays", 15th Australasion Fluid Mechanics Conference, The University of Sydney, Sydney, Australia, Dec. 13-17, 2004.
Papagiannakis, R. G., et al., "Emission characteristics of high speed, dual fuel, compression ignition engine operating in a wide range of natural gas/diesel fuel proportions", Fuel (2009).

* cited by examiner

*Primary Examiner* — Thomas Moulis
*Assistant Examiner* — Elizabeth Hadley
(74) *Attorney, Agent, or Firm* — Blakely Sokoloff Taylor & Zafman LLP

(57) ABSTRACT

A compression ignition engine includes a high pressure injector for injecting a liquid fuel into a first combustion cylinder and a low pressure injector for injecting a gaseous fuel into a second combustion cylinder. A controller is coupled to the high pressure injector and the low pressure injector. The controller selects one of a liquid fuel mode and a gaseous fuel mode. If the liquid fuel mode is selected, air is compressed in a first cylinder, the compressed air is transferred to a second cylinder, and the liquid fuel is injected into the second cylinder. If the gaseous fuel mode is selected, air is compressed in the second cylinder, the compressed air is transferred to the first cylinder, and the gaseous fuel is injected into the first cylinder.

21 Claims, 4 Drawing Sheets

MULTIPLE FUEL-TYPE COMPRESSION IGNITION ENGINES AND METHODS

CROSS REFERENCE TO RELATED APPLICATIONS

This application claims the benefit pursuant to 35 U.S.C. 119(e) of U.S. Provisional Application No. 61/469,553, filed Mar. 30, 2011, which application is specifically incorporated herein, in its entirety, by reference.

BACKGROUND

1. Field

Embodiments of the invention relate to the field of compression ignition engines; and more specifically, to the field of compression ignition engines capable of using either liquid or gaseous fuel.

2. Background

U.S. Pat. No. 7,793,638 discloses low emission high performance engines, multiple cylinder engines and operating methods that introduce numerous methods of operating unique engine configurations, the disclosure of which is hereby incorporated by reference. Among the engine configurations disclosed is a camless configuration having conventional intake and exhaust valves, and valves and manifolds coupled to low pressure and high pressure rails in a multi cylinder engine. In such an engine, some cylinders were devoted to operation as compression cylinders for supplying air at the appropriate pressure to the low pressure air rail and to the high pressure air rail and some cylinders are used as combustion cylinders having an injector, intake and exhaust valves and low pressure and high pressure air rail valves to allow the injection of air and fuel into the combustion cylinder at various stages of the operation of the combustion cylinder. The fuel used may be either a gaseous fuel or a liquid fuel (not both in the same engine), as the operation of the camless engine with electronic control of the valves and injectors allows control of both compression ignition and combustion for maximum power with minimum emissions.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
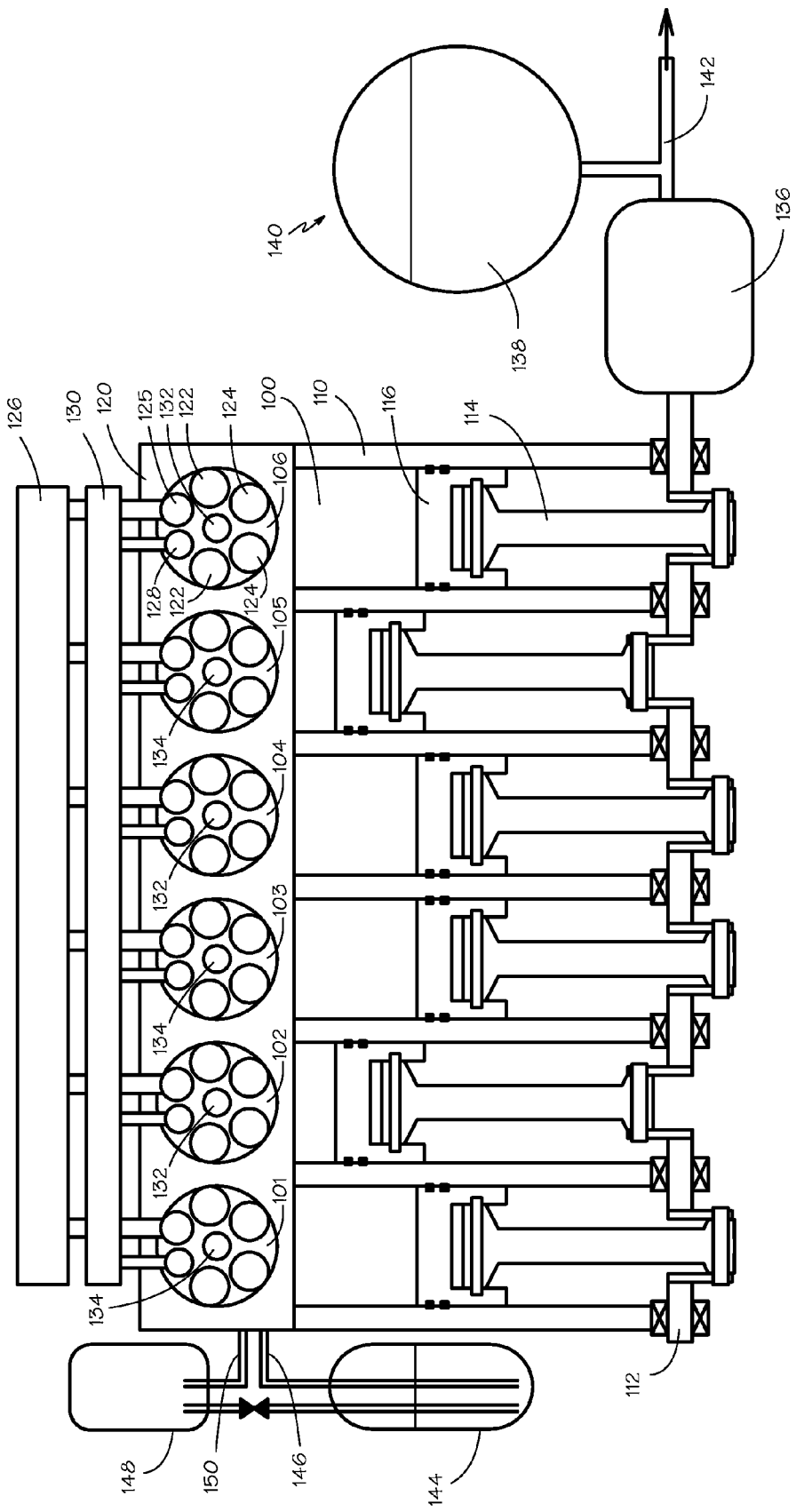
FIG. 1 is a schematic representation of one embodiment of an engine incorporating the present invention.

Now referring to FIG. 1, an exemplary engine in accordance with the present invention may be seen. The lower portion of the engine comprising the block 110, crankshaft 112, connecting rods 114, and pistons 116 in the cylinders may be of conventional design, and in that regard, some embodiments of the present invention may be suitable for retrofit of existing engines by changing the head to provide the features about to be described.

As may be seen in FIG. 1, the engine head 120 in this embodiment includes six valves per cylinder, specifically two intake valves 122, two exhaust valves 124, a valve 125 coupled to the low pressure air tank or low pressure air rail 126 and a valve 128 coupled to a high pressure air tank or high pressure air rail 130. Preferably these valves are all electronically controllable by an engine control system, such as by a Hydraulic Valve Actuation system of the general type disclosed in U.S. Pat. No. 6,739,293. In addition, each cylinder incorporates a fuel injector, specifically a high pressure injector 132 for liquid fuels or a low pressure injector 134 for gaseous fuels. Thus as may be seen in FIG. 1, the odd numbered cylinders 101, 103, 105 in the six cylinder engine shown, as numbered from the left, have the low pressure injector 134 for gaseous fuels and the even numbered cylinders 102, 104, 106 counting from the left have the high pressure injector 132 for injecting liquid fuels.

In use, when running on a single liquid fuel 144, the first 101, third 103, and fifth 105 cylinders would be used as compression cylinders and the second 102, fourth 104, and sixth 106 cylinders would be used as combustion cylinders. Liquid fuels 144 that might be supplied by a supply line 146 to the high pressure liquid fuel injectors 132 in such operation obviously include conventional diesel fuels, though other liquid fuels such as bio-diesel and ammonia may also be used. In that regard, because a camless engine is used with electronic control of valve operation as well as fuel injection, the effective compression ratios of both the compression cylinders 101, 103, 105 and the combustion cylinders 102, 104, 106 are readily controllable and particularly high compression ratios can be achieved by injecting already somewhat compressed air into the combustion chamber 100 from the low pressure air tank or low pressure air rail 126 early in the compression stroke of the combustion cylinder, which air because of its pre-compression will also be preheated so that both the pressures and temperatures achieved at the end of the compression stroke in the combustion cylinder may be much higher than normal, if needed for compression ignition of the particular fuel being used at the time.

Similarly for gaseous fuels 148 such as natural gas or propane (under some conditions, ammonia might be used as a gaseous fuel), gaseous fuel may be supplied by a supply line 150 to the low pressure gaseous fuel injectors 134 in the odd numbered cylinders 101, 103, 105 which may be used as combustion cylinders, again controlling valve operation and fuel injection to achieve compression ignition at or near the top dead center positions of the pistons in the combustion cylinders. The even numbered cylinders 102, 104, 106 may be used as compression cylinders. Ignition is at least in part controlled by sensing the time of ignition, either from sensing combustion chamber pressure or crankshaft angular acceleration, and then making minor adjustments for the next cycle based thereon. Combustion temperatures, on the other hand, are also readily controlled, when necessary, using methods disclosed in U.S. Pat. No. 7,793,638, by way of example, by assuring that ignition occurs in a fuel/air mixture with limited fuel present or with limited air (oxygen) present so the combustion temperatures are initially limited, with injection of air and/or fuel after ignition sustaining combustion through a relatively large crankshaft angle for complete combustion and efficient energy conversion during the power stroke.

For starting the engine, depending on the fuel intended to be used, it may be easier to start the engine from a cold condition using a fuel such as conventional diesel fuel and then switch to the other liquid or gaseous fuel intended to be used once the engine is warmed up, though other methods of starting may also be used, if desired.

In FIG. 1, the crankshaft 112 of the engine turns a hydraulic pump/motor 136 which pumps hydraulic fluid 138 to a high pressure for storage in a hydraulic accumulator 140 and for providing hydraulic energy 142 to a transmission, such as a vehicle transmission. Such a transmission might, by way of example, simply be one or more additional hydraulic motors coupled to the wheels of a vehicle or through a gear reduction to the wheels of a vehicle.

Figure 2:
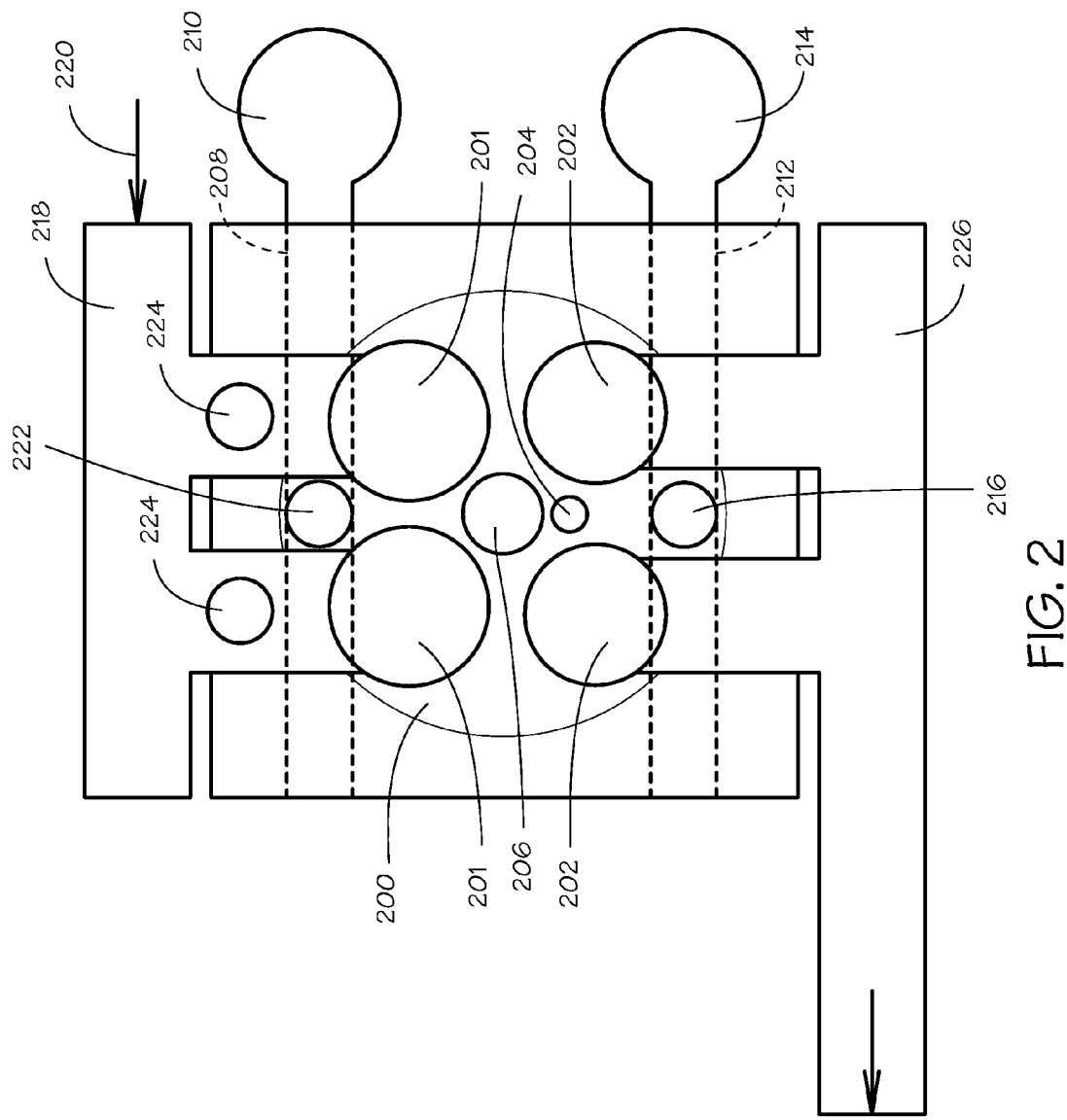
FIG. 2 is a schematic representation of the valving in one exemplary cylinder of an alternate embodiment of the present invention.

Now referring to FIG. 2, an alternate embodiment of the present invention may be seen. This Figure illustrates a single cylinder 200 of a multicylinder engine wherein all cylinders are the same. In this Figure, each cylinder 200 has two intake valves 201 and two exhaust 202 valves, a pressure sensor 204, and a fuel injector 206, which may be a diesel fuel injector though other liquid fuels may be used, such as bio-diesel, and perhaps still other liquid fuels such as gasoline and ammonia, for example. Again a high pressure rail 208 couples a high pressure air storage tank 210 to the cylinders through a high pressure air valve 222 and a low pressure rail 212 couples a low pressure air storage tank 214 to the cylinders through a low pressure air valve 216. The two exhaust 202 valves are coupled to an exhaust manifold 226.

In this embodiment, the gaseous fuel supply 224, when used, is mixed with the intake air 220 in the intake manifold 218 prior to the intake valves 201, as is well known in engines operating on a gaseous fuel alone, such as spark ignition natural gas powered engines. This embodiment allows the engine to operate on all cylinders as a compression ignition engine using either a gaseous fuel or a liquid fuel in a conventional cycle such as a four stroke cycle, or to use some of the cylinders for air compression purposes and the other cylinders as combustion cylinders with air injection into the combustion cylinders. This provides the further advantage of being able to use each cylinder as a compression cylinder part of the time and as a combustion cylinder part of the time to equalize the cooling requirements between cylinders to avoid hot spots and special engine block cooling requirements.

These present invention engines should not be confused with diesel engine to compressed natural gas (CNG) conversions which are now commercially available. Such conversions, in essence, convert a compression ignition diesel engine to a spark ignition engine, whereas the present invention maintains compression ignition regardless of the fuel being used. Further, of course, the present invention may use any operating methods or cycles, such as, by way of example, any of those disclosed in U.S. Pat. No. 7,793,638. Also while the engine shown on FIG. 1 is a conventional crankshaft type engine (FIG. 2 is not specific in this regard), the concept of the present invention is also applicable to free piston engines, such as free piston engines that use a plurality of individually controllable hydraulic cylinders for each free piston for controlling piston movements, velocity profiles, etc. and for delivery of hydraulic energy to a load, such as a hydraulic motor and/or hydraulic accumulator.

Figure 3:
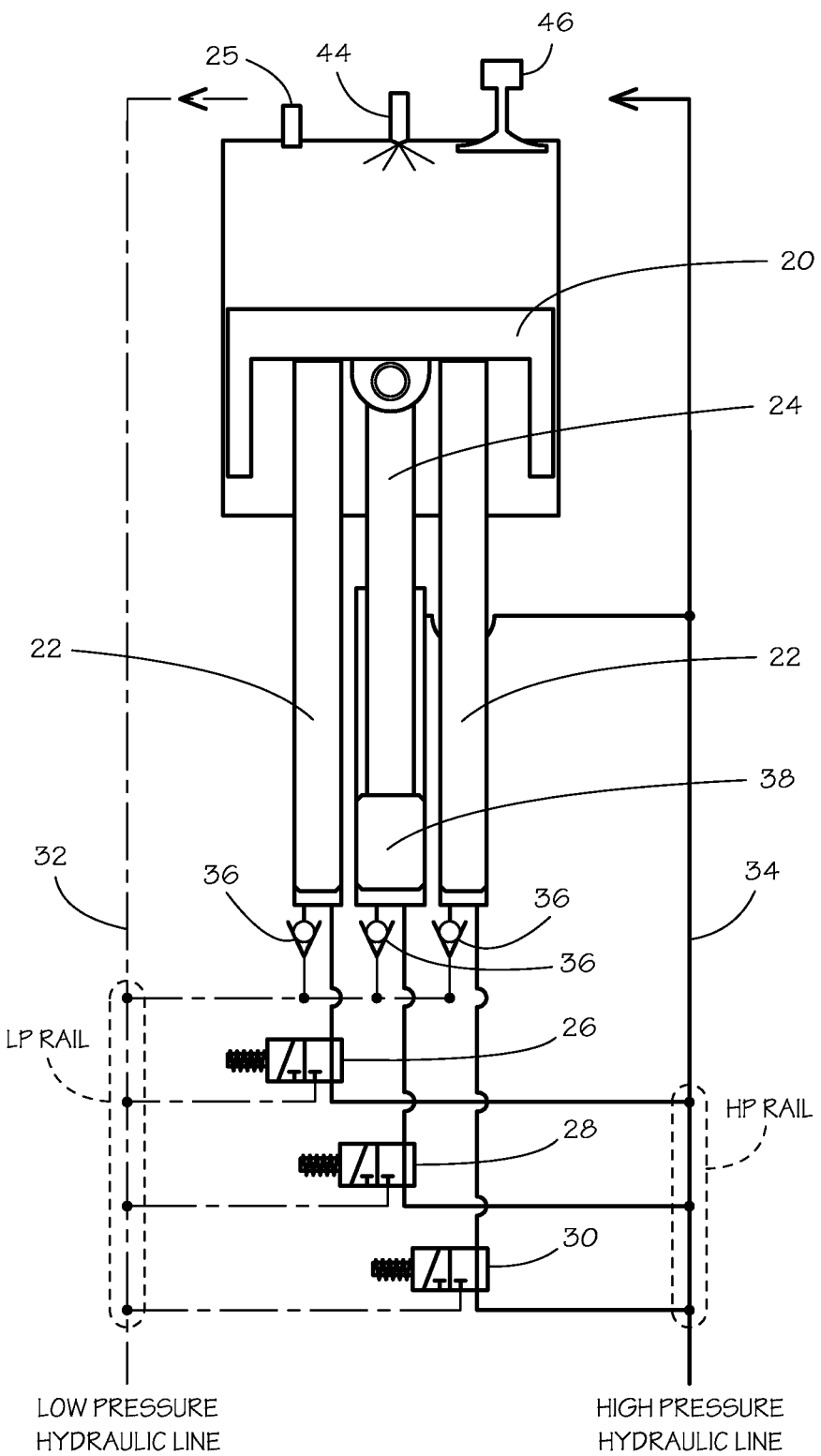
FIG. 3 is as schematic representation of one cylinder of a free piston engine in accordance with an embodiment of the present invention.

A single cylinder of such a free-piston hydraulic internal combustion engine, typically a multicylinder engine with fully variable electronically controlled hydraulic valve actuation, which may include high and low pressure air injection and high pressure electronically controlled fuel injection, is very schematically illustrated in FIG. 3. The two main subassemblies in the engine include the cylinder head assembly and the piston/plunger assembly with hydraulic valves. They are relatively independent of each other and will be described separately.

In this embodiment, the cylinder head assembly incorporates high pressure electronically controlled fuel injectors 44 using intensifier type fuel injectors, and again, an electronically controllable Hydraulic Valve Actuation system 46 of the general type disclosed in U.S. Pat. No. 6,739,293.

The piston/plunger assembly replaces the piston/connecting rod/crank-shaft assembly of a traditional engine, and converts the chemical energy released during combustion into hydraulic energy. It does this conversion by effectively pumping hydraulic fluid from the low pressure reservoir into the high pressure accumulators with properly timed opening and closing of electrically actuated hydraulic control valves.

The piston/plunger assembly may be described as follows. A piston 20 has a bottom mating surface with hydraulic plungers 22. There are a number of plungers for each piston, at least three, and potentially more, such as by way of example, 6 equally distributed around a seventh center plunger 24. The top of the plungers are pushed downward by the bottom surface of piston 20 (note that words like top, bottom, above, below, etc. are used for convenience in a relative sense in relation to the drawings, and not in an absolute sense, and are not to be construed as implying a limit in the actual orientation of the engine that may be used). At the bottom of the plungers are situated hydraulic volumes. Through electrically actuated three-way hydraulic valves 26, 28 and 30, herein called the plunger valves, each of these volumes is connected either to the low pressure (LP) rail 32 when the plunger valve is in the closed position, or to the high pressure (HP) rail 34 when the plunger valve is in the open position. The plunger volumes may each also be connected to the LP rail through check valves 36 to increase the flow area from the LP rail to the plunger hydraulic volume without increasing the control valve flow area and size.

The return of the piston 20 and plungers 22 and 24 to the bottom position during an intake stroke is facilitated by a hydraulic return arrangement shown in FIG. 3. The hydraulic return is the reason why the center plunger is connected to the piston. At least one plunger, preferably the center plunger 24, must be able to pull on the piston to move it downward during the intake stroke. As shown in FIG. 3, the bottom of the center plunger is larger in diameter than the upper portion, and in this embodiment, the annular area above the upper portion is coupled to the high pressure rail at all times. This provides a downward force on the center piston when the bottom of the center piston is coupled to the low pressure rail for piston 20 return, such as for an intake stroke, but an upward force when the bottom of the piston 20 is coupled to the high pressure rail by valve 26, such as may be used during a compression stroke or during a power stroke. Also as an alternative, the region above enlarged end 38 of center plunger 24 may be coupled to a control valve so as to be controllably coupled to the high pressure rail or the low pressure rail. Note that in all cases for all plungers, the low pressure rail should be high enough in pressure to backfill the corresponding hydraulic volume as the plungers move away from the respective hydraulic fluid inlet port for the respective plunger, i.e., when the plungers move up.

Using multiple plungers for each engine cylinder allows for approximate matching or balancing the pressure force on top of the pistons with the hydraulic pressure force on the bottom of the plungers through the entire engine cycle, thereby facilitating a controlled piston/plunger velocity at any point of the combustion cycle, which in turn facilitates a high efficiency chemical to hydraulic energy conversion. A pressure sensor 25 may be provided in the combustion chamber to provide an input to a controller that manages the piston/plunger velocity, if desired, though monitoring the hydraulic control valve positions and piston position, and from piston position versus time, the piston velocity and acceleration, provides essentially all information needed.

If six plungers 22 are used in addition to the center plunger 24, two diametrically opposed plungers may be controlled by one valve, say valve 26, and the other four by valve 30. If the center plunger 38 is the same net size as the other six plungers, then by way of example, during a power stroke, seven plungers may be used for pumping hydraulic fluid to the high pressure rail (and a high pressure accumulator), then six (all except the center plunger 24), then five (four plus the center plunger 24), then four (the four plungers controlled by one of the valves), then three (the two plungers controlled by one of the valves plus the center plunger), etc., providing a binary progression to well match the desired piston force to have excellent control over piston position and velocity at all times.

Alternatively, each plunger may have its own control valve, though in such an embodiment, the control valves for diametrically opposed plungers would be operated in unison to avoid a torque in the piston 20 about a horizontal axis. Accordingly, as a further alternative, each valve may control opposing pairs of plungers. Also such embodiments make it easier to obtain the binary progression described above, as the valve switching to obtain the desired result is reduced. Obviously, high speed, electronically controlled, electrically actuated valves preferably should be used, also preferably two stage spool valves to provide the flow areas needed.

In the engine of the type shown in FIG. 3, typically multiple cylinders would be used. In such an engine, the engine head arrangement (intake and exhaust valves, liquid fuel injection and gaseous fuel intake, and high and low pressure air rails, etc.) may, for example, be in accordance with that shown in FIG. 1 or FIG. 2. Conventional four stroke operating cycles may be used, though two stroke operation is also possible, as well as any other operating cycles using compression and injection of low pressure and/or high pressure air, such as disclosed in U.S. Pat. No. 7,793,638. In that regard, note that the engine may be run at full output, and stopped dead within one cycle, and later restarted at full power, also within one cycle.

Figure 4:
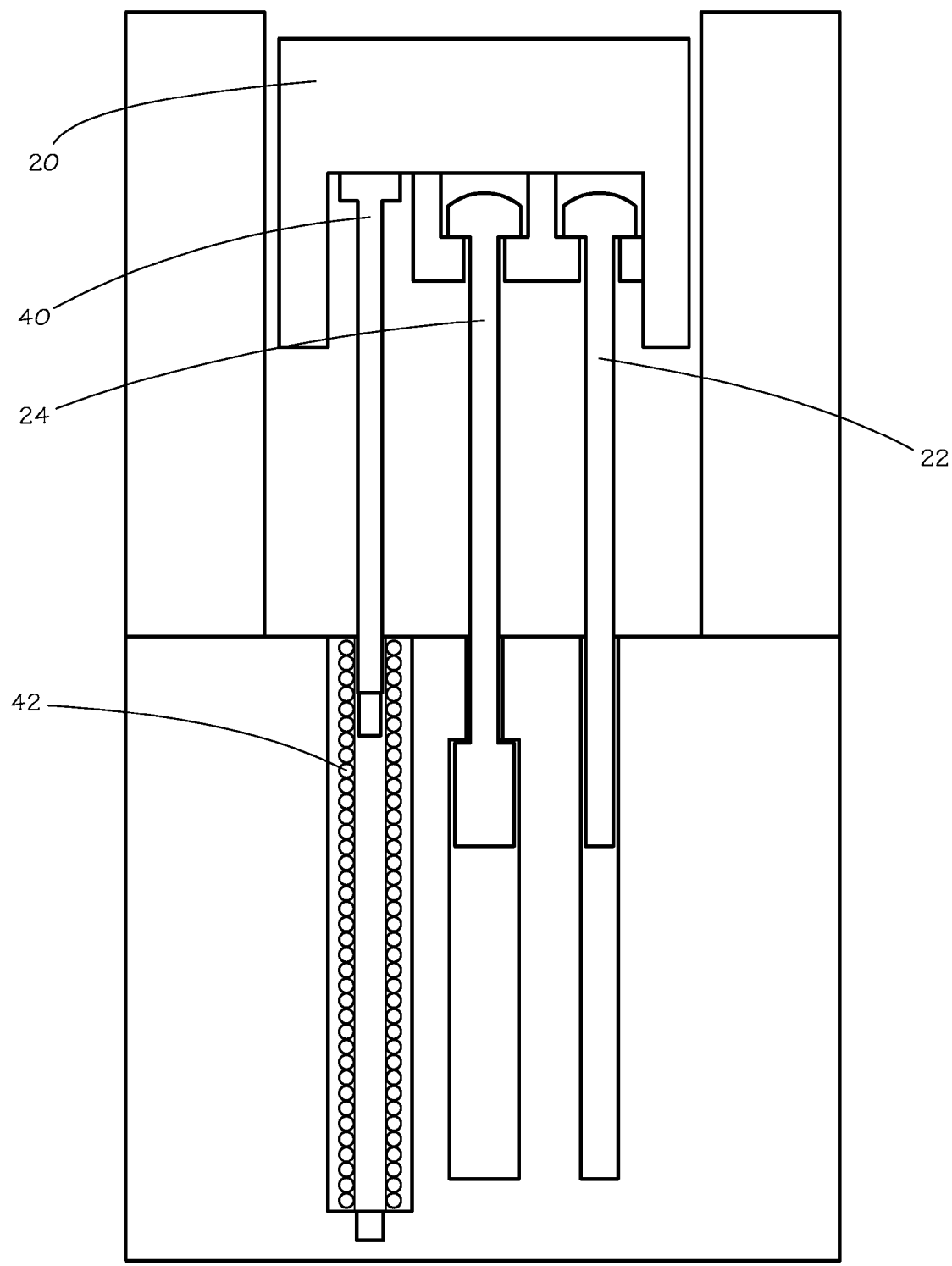
FIG. 4 schematically illustrates a free piston position sensing system that may be used with a free piston embodiment of the present invention.

In a free piston engine, by definition there is no predefined piston position or motion, and in particular, piston velocities and piston extreme positions, as there is for a piston in a crankshaft type engine. Accordingly it is essential to know the position and velocity of a free piston in a free piston engine so that velocity extremes, particularly high velocity extremes, may be avoided and piston extreme positions predefined or at least controlled. Accordingly, FIG. 4 schematically illustrates a free piston position sensing system that may be used for this purpose. In particular, the free piston 20 on a downward motion of a power stroke pumps hydraulic fluid using a variable number of hydraulic pistons to pump to the high pressure rail and accumulator, as hereinbefore described, to control the velocity of the free piston 20. Center hydraulic piston 24, on the other hand, provides a free piston return capability as well as an intake stroke capability as hereinbefore described.

For piston position sensing, however, a magnetic steel plunger 40 is used together with a coil 42 which is excited with a relatively high frequency AC signal. The impedance of the coil will vary with the position of the magnetic plunger 40. While the variation in impedance with plunger position may not be linear and/or the circuitry for sensing the impedance may not be linear, a calibration curve may readily be applied to linearize the output signal with piston position. In that regard, since the free piston engine is processor controlled, the calibration may easily be done in the digital domain by converting the nonlinear signal to a digital signal through an analog-to-digital converter and then linearized by way of a lookup table to provide true piston position in digital form for use by the free piston engine digital controller. Obviously FIG. 4 is a schematic diagram, though illustrates the principles of the free piston position sensor.

Therefore, engines in accordance with the present invention may be conventional crankshaft engines or free piston engines, though most preferably are engines with electronically controlled engine valve, fuel injection and air injection operation to obtain the full flexibility of the engine. Both types of engines allow reasonable control of the compression ratio and the expansion to compression ratio, though the free piston engine is most flexible in this regard because the upper and lower piston position limits are not irrevocably set as in a crankshaft type of engine.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A compression ignition engine comprising:
   a first combustion cylinder;
   a high pressure injector for injecting a liquid fuel into the first combustion cylinder;
   a second combustion cylinder;
   a low pressure injector for injecting a gaseous fuel into the second combustion cylinder;
   a controller coupled to the high pressure injector and the low pressure injector, the controller performing operations including
      selecting one of a liquid fuel mode or a gaseous fuel mode;
      if the liquid fuel mode is selected,
         compressing air in a first cylinder,
         transferring the compressed air to a second cylinder, and
         injecting the liquid fuel into the second cylinder; and
      if the gaseous fuel mode is selected,
         compressing air in the second cylinder;
         transferring the compressed air to the first cylinder; and
         injecting the gaseous fuel into the first cylinder.

2. The compression ignition engine of claim 1 wherein the controller performs further operations including sensing a time of ignition and adjusting an immediately following cycle based on the sensed time of ignition.

3. The compression ignition engine of claim 1 wherein the liquid fuel is ammonia.

4. The compression ignition engine of claim 1 wherein the gaseous fuel is ammonia.

5. The compression ignition engine of claim 1 further comprising:
   an air tank coupled to the first cylinder and the second cylinder; and
   wherein transferring the compressed air further comprises transferring the compressed air to the air tank and transferring the compressed air from the air tank to one of the first cylinder or the second cylinder.

6. The compression ignition engine of claim 1 further comprising:
- a low pressure air tank coupled to the first cylinder and the second cylinder;
- a high pressure air tank coupled to the first cylinder and the second cylinder; and
- wherein transferring the compressed air further comprises transferring the compressed air to one or both of the low pressure air tank and the high pressure air tank and transferring the compressed air from one or both of the low pressure air tank and the high pressure air tank to one of the first cylinder or the second cylinder.

7. A method for operating a compression ignition engine, the method comprising:
- selecting one of a liquid fuel mode or a gaseous fuel mode;
- if the liquid fuel mode is selected,
  - compressing air in a first cylinder,
  - transferring the compressed air to a second cylinder, and
  - injecting a liquid fuel into the second cylinder; and
- if the gaseous fuel mode is selected,
  - compressing air in the second cylinder;
  - transferring the compressed air to the first cylinder; and
  - injecting a gaseous fuel into the first cylinder.

8. The method of claim 7 further comprising sensing a time of ignition and adjusting an immediately following cycle based on the sensed time of ignition.

9. The method of claim 7 further comprising injecting the liquid fuel with a high pressure injector.

10. The method of claim 7 further comprising injecting the gaseous fuel with a low pressure injector.

11. The method of claim 7 wherein the liquid fuel is ammonia.

12. The method of claim 7 wherein the gaseous fuel is ammonia.

13. The method of claim 7 wherein transferring the compressed air further comprises transferring the compressed air to an air tank and transferring the compressed air from the air tank to one of the first cylinder or the second cylinder.

14. The method of claim 13 wherein transferring the compressed air to the air tank further comprises transferring the compressed air to one or both of a low pressure air tank and a high pressure air tank.

15. The method of claim 14 wherein transferring the compressed air to one of the first cylinder or the second cylinder further comprises transferring the compressed air from one or both of the low pressure air tank and the high pressure air tank.

16. A compression ignition engine comprising:
- a plurality of combustion cylinders, each combustion cylinder including at least one intake valve and a high pressure injector for injecting a liquid fuel into the combustion cylinder;
- an intake manifold coupled to the plurality of combustion cylinders for supplying intake air to the plurality of combustion cylinders when the at least one intake valve is open;
- a gaseous fuel supply that mixes gaseous fuel with the intake air in the intake manifold;
- a controller coupled to the high pressure injector and the gaseous fuel supply, the controller performing operations including
  - selecting one of a liquid fuel mode or a gaseous fuel mode;
  - if the liquid fuel mode is selected,
    - compressing air in a first cylinder selected from the plurality of combustion cylinders,
    - transferring the compressed air to a second cylinder selected from the plurality of combustion cylinders, and
    - injecting the liquid fuel into the second cylinder; and
  - if the gaseous fuel mode is selected,
    - compressing air in the first cylinder;
    - transferring the compressed air to the second cylinder; and
    - mixing the gaseous fuel with the intake air supplied to the second cylinder.

17. The compression ignition engine of claim 16 wherein the controller performs further operations including sensing a time of ignition and adjusting an immediately following cycle based on the sensed time of ignition.

18. The compression ignition engine of claim 16 wherein the liquid fuel is ammonia.

19. The compression ignition engine of claim 16 wherein the gaseous fuel is ammonia.

20. The compression ignition engine of claim 16 further comprising:
- an air tank coupled to the first cylinder and the second cylinder; and
- wherein transferring the compressed air further comprises transferring the compressed air to the air tank and transferring the compressed air from the air tank to one of the first cylinder or the second cylinder.

21. The compression ignition engine of claim 16 further comprising:
- a low pressure air tank coupled to the first cylinder and the second cylinder;
- a high pressure air tank coupled to the first cylinder and the second cylinder; and
- wherein transferring the compressed air further comprises transferring the compressed air to one or both of the low pressure air tank and the high pressure air tank and transferring the compressed air from one or both of the low pressure air tank and the high pressure air tank to one of the first cylinder or the second cylinder.

* * * * *